(12) United States Patent
Zaffaroni et al.

(10) Patent No.: US 9,249,342 B2
(45) Date of Patent: Feb. 2, 2016

(54) POLYMERIC PTC THERMISTORS

(71) Applicant: HENKEL AG & CO. KGAA, Duesseldorf (DE)

(72) Inventors: Giorgio Zaffaroni, Milan (IT); Daniela Sicari, Milan (IT); Eugen Bilcai, Oberschliessheim (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 111 days.

(21) Appl. No.: 14/245,555

(22) Filed: Apr. 4, 2014

(65) Prior Publication Data

US 2014/0218163 A1    Aug. 7, 2014

Related U.S. Application Data

(63) Continuation of application No. PCT/EP2012/069741, filed on Oct. 5, 2012.

(30) Foreign Application Priority Data

Oct. 6, 2011  (EP) .................... 11425244

(51) Int. Cl.
| | |
|---|---|
| *H01C 1/14* | (2006.01) |
| *C09J 9/02* | (2006.01) |
| *C08K 3/04* | (2006.01) |
| *C08K 3/08* | (2006.01) |
| *C09J 163/00* | (2006.01) |
| *H01C 7/02* | (2006.01) |

(52) U.S. Cl.
CPC ... *C09J 9/02* (2013.01); *C08K 3/04* (2013.01); *C08K 3/08* (2013.01); *C09J 163/00* (2013.01); *H01C 1/1406* (2013.01); *H01C 7/027* (2013.01); *C08K 2003/085* (2013.01); *H01C 7/028* (2013.01)

(58) Field of Classification Search
CPC ...... C08K 3/04; C08K 3/08; C08K 2003/085; C09J 63/00; C09J 9/02; C08L 63/00; H01C 1/1406; H01C 7/027; H01C 7/028

USPC .......................... 338/322, 22 R, 13
See application file for complete search history.

(56) References Cited

U.S. PATENT DOCUMENTS

| | | | | |
|---|---|---|---|---|
| 4,966,729 | A | | 10/1990 | Carmona et al. |
| 5,651,922 | A | * | 7/1997 | Nahass ............. H01B 1/24 252/502 |
| 6,218,928 | B1 | * | 4/2001 | Okada ............ C01G 29/00 338/22 R |
| 6,479,575 | B1 | | 11/2002 | Chu et al. |
| 2002/0093007 | A1 | | 7/2002 | Handa et al. |
| 2003/0062983 | A1 | * | 4/2003 | Duggal ............. H01C 1/1406 338/22 R |
| 2003/0218530 | A1 | | 11/2003 | Yoshinari et al. |
| 2006/0118767 | A1 | | 6/2006 | Jang et al. |
| 2010/0038025 | A1 | | 2/2010 | Keite-Telgen-Buescher et al. |

FOREIGN PATENT DOCUMENTS

| | | |
|---|---|---|
| BE | 785607 A1 | 12/1972 |
| EP | 0731475 A2 | 9/1996 |
| EP | 0932166 A1 | 7/1999 |

OTHER PUBLICATIONS

Bajaj, Pushpa, et al. Effect of Coupling Agents on Thermal and Electrical Properties of Mica/Epoxy Composites. Journal of Applied Polymer Science, vol. 56, 1339-1347 (1995).

Fournier, J., et al. Positive temperature coefficient effect in carbon black/epoxy polymer composites. Journal of Materials Science Letters, Chapman & Hall, 16, 1677-1679 (1997).

* cited by examiner

*Primary Examiner* — Kyung Lee
(74) *Attorney, Agent, or Firm* — James J. Cummings

(57) ABSTRACT

The subject matter of the present application is a curable adhesive composition having PTC characteristics after curing, containing (i) a reactive binder system, based on an epoxy-resin-component and a curing agent-component, (ii) particles of a carbon modification in a range of 0.01 wt % to 15.0 wt %, based on the total weight of the curable adhesive composition, and (iii) copper powder in a range of 0.5 wt % to 5.0 wt %, based on the total weight of the curable adhesive composition, wherein the reactive binder system comprises>70 wt % of all organic polymers of the adhesive composition.

16 Claims, No Drawings

POLYMERIC PTC THERMISTORS

CROSS-REFERENCE TO RELATED APPLICATION

This application claims the benefit of PCT/EP2012/069741 filed on Oct. 5, 2012, which claims the benefit of EP Application No. 11425244.8, filed on Oct. 6, 2011, both incorporated by reference herein in their entireties.

FIELD OF THE INVENTION

The present invention relates to an adhesive composition having PTC (positive temperature coefficient) characteristics. The adhesive composition allows the production of PTC-elements. PTC-elements are elements which are electrically conductive at low temperatures, however the electrical conductivity decreases drastically after a certain temperature barrier is reached. These PTC-elements can be used as current switch. The current heats the PTC-element depending on the amperage. Is the amperage to high, then the PTC-elements is heated to a temperature, at which the resistivity increases strongly. So the amperage is automatically limited. The PTC-elements can also be used as heating elements, for example for heating of fuel filters in diesel vehicles.

BACKGROUND OF THE INVENTION

PTC-elements can be built up of ceramics or organic polymers for example. Organic polymers are doped with conductive particles, like graphite or carbon black for example. The conductive particles allow electrical current flow under low temperatures as they are in contact which each other, but through heating the polymer matrix expands and consequently the particles loose their contact and finally an electrical current flow is hindered or even not longer possible.

EP 0 731 475 describes a positive temperature coefficient composition comprising, by weight, based on total composition, 10-30% electrical conductive phase, 10-40% chlorinated, maleic anhydride grafted, polypropylene resin, and 30-80% organic medium capable of solubilizing the resin. The composition contains electrical conductive fillers such as carbon black, graphite and the like. It further describes a sheet comprising a cast layer of the positive temperature coefficient composition which has been heated to remove volatile organic solvent.

EP 0 932 166 A1 describes a polymeric PTC composition comprising an organic polymer and conductive particles having a melting point of not less than 2000° C. dispersed therein, with the conductive particles being treated with a coupling agent. The conductive particles are selected from the group consisting of a metal, a metal carbide, a metal boride, a metal silicide and a metal nitride and are contained in an amount of 50 to 99% by weight based on the composition.

U.S. Pat. No. 6,479,575 describes a conductive polymer blend composition exhibiting PTC behavior, comprising a first polymer having a melt flow index of 5.0 to 15.0 and constituting approximately 5 to 45 percent by weight of said composition, a second polymer having a melt flow index less than 1.0 and constituting approximately 2 to 40 percent by weight of said composition, and at least one conductive particulate component. Preferably a mixture of at least two different conductive particulates is used in order to minimize the resistance hysteresis effect.

US 2002/0093007A1 describes an organic positive temperature coefficient thermistor comprising a matrix of at least two polymers, a low-molecular weight organic compound, and conductive particles having spiky protuberances, wherein said matrix contains a thermoplastic elastomer. The amount of the conductive particles is relatively high and should be 1.5 to 8 times as large as the total weight of the polymer matrix and low-molecular organic compound (the total weight of organic components inclusive of curing agent and other additives).

US 2003/0218530 A1 describes an organic positive temperature coefficient thermistor comprising a thermistor body comprising a high-molecular weight organic compound-containing matrix and metal particles, wherein a non-metallic powder of conductive non-metallic fines attaches to surfaces of the metal particles. The use of epoxy resins is not mentioned in that document.

The effect of coupling agents on thermal and electrical properties of mica/epoxy composites is described in the Journal of Applied Polymer Science, Vol. 56, 1339-1347 (1995), in particular the influence of 3-aminopropyltriethoxysilane, 3-glycidyloxypropyltrimethoxysilane, and neoalkoxytri(dioctylpyrophosphato)zirconate on thermal expansion behavior, dielectric strength, and arc resistance of mica/epoxy composites is described there.

A general overview about temperature-sensitive PTC conductive polymer composite is given in the Encyclopedia of Polymer Science and Technology: Conductive Polymer Composite, Wiley, 2005.

Fournier describes in the Journal of Materials Science Letters 16 (1997) 1677-1679 the positive temperature coefficient effect in carbon black/epoxy polymer composites.

US 2006/0118767 A1 describes an anisotropic conductive adhesive having PTC characteristics comprising an insulating adhesive component and a plurality of conductive particles dispersed in the insulating adhesive component, wherein the insulating adhesive component contains a crystalline polymer. The crystalline polymer is selected from copolymers of a monomer having ester group, ether group, methylene group or polar group. Examples are polyamide resins, polymethylmethacrylates and polyvinylbutyral resins. The crystalline polymer provides PTC characteristics only when it is added in an amount of 30 wt % to 70 wt % relative to the insulating adhesive component. Additionally, the adhesive may comprise thermosetting resins such as epoxy resins or radical polymerizable compounds. By using an additional thermoplastic resin, the anisotropic conductive adhesive can be prepared in the form of a film.

US 20100038025 A1 describes a planar structure comprising at least one layer of an adhesive within which heat can be generated, wherein the adhesive is a hotmelt adhesive and a posistor. Preferably, the hotmelt adhesive is consisting of polyolefins, copolymers of polyolefins, ionomers, polyamides and/or copolymers of polyamides. The electrically conductive materials, which are preferably used are carbon nanotubes and/or carbon nanofibers. The use of graphite and/or carbon black is also possible.

SUMMARY OF THE INVENTION

The objective of this invention was to develop a thermosetting adhesive which can integrate the PTC thermistor properties and the adhesive functions.

This problem was solved by the subject of this invention, which is a curable adhesive composition having PTC characteristics after curing, comprising
 (i) a reactive binder system, based on an epoxy-resin-component and a curing agent-component, preferably in amounts of 30-90 wt %, based on the total weight of the curable adhesive composition, (ii) particles of a carbon modification in a range of 0.01 wt % to 15.0 wt %, based on the total weight of the curable adhesive composition, (iii) copper powder in a range of 0.5 wt % to 5.0 wt %, based on the total weight of the curable adhesive composition, and wherein the reactive binder system comprises >70 wt % of all organic polymers of the whole adhesive composition.

The particles of a carbon modification act as conductive particles. Preferably they have a particle size in the range from 0.1 to 100 µm, more preferably from 1 to 80 µm. Particle size can be determined by electron microscopy, for example.

In principle, any copper powder can be used, which is conductive, but most preferred are copper powders, wherein the copper powder particles are coated with silver (silver coated copper powder). An advantage of such conductive copper powder, in combination with the other features of our invention, is to keep the room temperature resistance of the resulting epoxy PTC elements much more constant.

The copper powder, in particular the silver coated copper, preferably has a particle size in the range from 0.1 to 100 µm, preferably from 1 to 80 µm. Particle size can be determined by electron microscopy, for example. The silver content in the case of silver coated copper is preferably in the range from 1% to 50 wt %, for example in the range from 5 to 25 wt %, based on the coated copper powder as a whole. Suitable silver coated copper powders are available for example under the name of KONTAKTARGAN® from ECKA Granules Germany GmbH, Fürth, Germany.

DETAILED DESCRIPTION OF THE INVENTION

The curable adhesive composition according to the present invention enables an easy in situ preparation of PTC-elements or heating elements. The manufacturing time is decreased. Any possible shape for the elements can be chosen. The inventive adhesive integrates the heating temperature self-regulating capability and adhesive functions. The combination of particles of carbon modifications with copper powder provides an outstanding operational reliability in connection with a binder system based on an epoxy-resin-component and a curing agent-component.

The inventive adhesive can work as a PTC thermistor after curing. The cured adhesive can act as a switch to intercept current flow by sudden increase of electrical resistance caused by volume expansion due to temperature rising. The inventive adhesive enables the manufacture of very robust and mechanically resilient PTC-elements. Besides the inventive adhesives show superior processibility. The inventive adhesive can be applied in pourable, castable or ductile form, which allows a maximum freedom to design. After hardening a PTC thermistor is obtained, in which the resistance increases with increasing temperature. The room temperature resistance of the resulting epoxy PTC elements is highly constant.

The reactive binder system of our invention is based on epoxides or epoxy-resin-components and curing agents for epoxides. Such reactive binder systems are known per se, especially as epoxy adhesives. It is possible to apply one-component-epoxy adhesives as well as two-component-epoxy adhesives in the sense of our invention.

One-component epoxy-adhesives comprise hardeners for epoxides, which are preferably activated by heat. Such one-component epoxy-adhesives as well as the corresponding hardeners are well known to the person skilled in the art. Two-component-epoxy adhesives harden after mixing, preferably at room temperature, for example in a temperature range from 15° C. to 25° C. In this case one component comprises epoxides or epoxy-resin-components with reactive epoxy-groups. The other component comprises a curing agent for epoxides.

Suitable epoxides or epoxy-resin-components are well known in the state of the art and preferably include polyepoxides which have at least 2 1,2-epoxy groups per molecule. The epoxide equivalent of these polyepoxides can preferably vary between 150 and 4000. The polyepoxides can in principle be saturated, unsaturated, cyclic or acyclic, aliphatic, alicyclic, aromatic or heterocyclic polyepoxide compounds. Examples of suitable polyepoxides include the polyglycidyl ethers which are prepared by reacting epichlorohydrin or epibromohydrin with a polyphenol in the presence of alkali. Polyphenols suitable for this purpose include, for example, resorcinol, pyrocatechol, hydroquinone, bisphenol A (2,2-bis (4-hydroxyphenyl)propane), bisphenol F (bis(4-hydroxyphenyl)methane), 1,1-bis(4-hydroxyphenyl)isobutane, 4,4'-dihydroxybenzophenone, 1,1-bis(4-hydroxyphenyl)-ethane, 1,5-hydroxynaphthalene. Likewise suitable are diglycidyl ethers of ethoxylated resorcinol (DGER), e.g., from Indspec Chemical Corporation.

Suitable curing agents for epoxides are well known in the state of the art, too, and preferably include di- or polyols or di- or polyamines or di- or polythiols or mixtures of them, for example.

As the reactive binder systems of our invention are well known in the art and well established, there is no need of more detailed explanations.

In one preferred embodiment of the invention the reactive binder system comprises ≥75 wt %, preferably ≥80 wt %, more preferably ≥85 or even ≥95 wt % of all organic polymers of the adhesive composition. This leads to very good quality characteristics in view of mechanical adhesion, electrical connection and PTC characteristics. The reactive binder system may even comprise all organic polymers of the adhesive composition.

In a further preferred embodiment of the invention the carbon modification is selected from carbon fibers, graphite, carbon black, activated carbon, carbon nanotubes or combinations thereof, all of which are regarded as particles in the sense of our invention. The inventors have found, that the above mentioned carbon modifications, in combination with the other features of our invention, enhance the very good operational reliability.

In another especially preferred embodiment, the adhesive composition according to invention comprises 1-3 wt % of copper powder, preferably silver coated copper, based on the total weight of the curable adhesive composition.

In another preferred embodiment of the invention the total amount of conductive particles is in a range of 1 wt % to 12.0 wt %, preferably 5 wt % to 10.0 wt %, based on the total weight of the curable adhesive composition. These ranges are advantageous, because they allow excellent electrical conductivity and adequate increase of electrical resistance with increasing temperature. Conductive particles in the sense of this invention comprise at least the particles of a carbon modification and the copper powder, which may be coated with silver.

In a preferred embodiment of the invention the reactive binder system has a glass-transition temperature after hardening of ≥100° C., preferably ≥120° C., even more preferably ≥140° C., determined via dynamic scanning calorimetry. Although the glass-transition temperature seems to be relatively high, the hardened binder system has surprisingly good mechanical properties even at lower temperatures, for example T<20° C.

The glass-transition temperature has impact on the trip point temperature of the element, so a high glass-transition temperature offers the advantage to have a high heating power of the element itself. The trip point temperature is the temperature where the PTC thermistors resistance increases sharply.

In another preferred embodiment, the adhesive composition according to invention comprises 0.02-1 wt %, preferably 0.04 wt % of toughening fibers. Most preferred are polyaramide fibers, like Kevlar® from DuPont, for example Kevlar® fibre IF 538 from DuPont. The use of such toughening fibers obviates the microcracking of the inventive epoxy PTC elements.

According to another preferred embodiment of the present invention the adhesive composition comprises at least one epoxide, which is liquid at a temperature of 22° C. Application of such epoxides results in optimal mechanical adhesion, electrical connection and PTC characteristics.

According to another preferred embodiment of the present invention the electrical conductivity of the cured composition is substantially isotropic, wherein the specific electrical resistance at 22° C. is in the range from 1 $\Omega$cm to $10^5$ $\Omega$cm, preferably $10^2$ to $10^4$ $\Omega$cm, most preferred $5 \cdot 10^2$ $\Omega$cm to $5 \cdot 10^3$ $\Omega$cm.

The viscosity of the uncured adhesive material depends of shear rate, in a preferred embodiment of the invention the system viscosity at 22° C. and infinite shear rate is 10 to 150 Pa·s, preferably 10 to 25 Pa·s. The shear rate was measured as a function of applied shear stress using a AR550 TA viscosimeter, 40 mm 2° steel cone, 22° C. The measured values were fitted with Casson Model to calculate viscosity from 0.3 $s^{-1}$ to 40 $s^{-1}$ shear rate with a duration of 6 minutes. The preferred viscosity allows having an element with its shape even before polymerization process.

In one preferred embodiment of the invention the adhesive composition comprises 10-50 wt %, preferably 20-30 wt % of inert filler with a dieletrical strength>60 MV/m, for example Mica N (Muskovite mica, ex Aspanger Bergbau and Mineralwerke GmbH), spheriglass, silica, etc. The inert filler improves uniformity of electric current in the polymer matrix and is used to avoid the risk of shortcutting.

A preferred embodiment of our invention is a curable adhesive having PTC characteristics after curing, comprising
(i) a reactive binder system, based on an epoxy-resin-component and a curing agent-component, in amounts of 40-70 wt %,
(ii) carbon black, in amounts of 1-10.0 wt %,
(iii) copper powder, preferably silver coated copper powder, in amounts of 0.5-3 wt %,
(iv) toughening fibers, in amounts of 0.02-1 wt %,
(v) inert filler with a dieletrical strength>60 MV/m, in amounts of 10-50 wt %,
wt % for (i) to (v) in each case based on the total weight of the curable adhesive composition, wherein the reactive binder system comprises≥75 wt % of all organic polymers of the whole adhesive composition,
wherein the reactive binder system has a glass-transition temperature after hardening of≥100° C., determined via dynamic scanning calorimetry.

A further subject of the present invention is an assembly, containing a first and a second electrode, which are jointly glued with a cured adhesive composition according to the preceding description. In this assembly, the cured adhesive composition acts as a PTC-element. As the adhesive composition is pourable or at least ductile before curing, the PTC-element can be formed in any desired design. Therefore, it is possible, that the design of the PTC-elements can be adopted for every site of operation.

In another embodiment it is preferred, that after glueing of the electrodes, but before curing the adhesive, an electrical field is applied between the electrodes. This can orientate the conductive particles, which are in the adhesive, which is advantageous for the resulting PTC-function. The orientation of the conductive particles also leads to a warming of the adhesive, which supports a homogeneous hardening of the adhesive.

The use of the PTC adhesive allows the device itself to work at different power levels by changing the distance between the electrodes. The PTC adhesive allows a lower contact thermal resistance between conductive metallic electrodes and the adhesive.

The term "electrode" covers in the broadest sense every electrically conductive body, which can be metallic or ceramic, for example. An electrode can also be made of graphite, silicium or metal semiconductor.

In a preferred embodiment of the invention the electrodes of the inventive assembly are mesh electrodes, preferably based on steel, aluminium or copper, most preferred copper. The use of mesh electrodes is to the best advantage, because the metal nets allow to decrease memory effect and to prepare elements of any shape.

A preferred embodiment is an assembly, containing a first and a second mesh electrode, based on copper, which are jointly glued with an adhesive composition, according to our invention, comprising
(i) a reactive binder system, based on an epoxy-resin-component and a curing agent-component, in amounts of 40-70 wt %,
(ii) carbon black, in amounts of 1-10.0 wt %,
(iii) copper powder, preferably silver coated copper powder, in amounts of 0.5-3 wt %,
(iv) toughening fibers, in amounts of 0.02-1 wt %,
(v) inert filler with a dieletrical strength>60 MV/m, in amounts of 10-50 wt %,
wt % for (i) to (v) in each case based on the total weight of the curable adhesive composition, wherein the reactive binder system comprises≥75 wt % of all organic polymers of the whole adhesive composition,
and wherein the reactive binder system has a glass-transition temperature after hardening of≥100° C., determined via dynamic scanning calorimetry.

In a further preferred embodiment of the invention the assembly is a heating element or part of a heating element.

A further subject of the present invention is a process for producing an assembly as described before, wherein a curable adhesive composition is
(i) applied between two electrodes, preferably (copper) mesh electrodes, so that the electrodes are connected with the adhesive and thereafter (ii) the adhesive is cured.

In a preferred embodiment of this process the reactive binder system has a cure cycle of 1 hour at 100° C. plus 1 hour at 180° C., preferably 1 hour at 100° C. plus 1 hour at 150° C.

EXAMPLES

A curable adhesive in accordance with the following composition was cured. The cured adhesive showed excellent PTC characteristics. The adhesive enabled the manufacture of very robust and mechanically resilient PTC-elements. Besides the adhesive showed superior processibility, especially when used for an assembly with copper mesh electrodes.

Below the exemplary formulation in line with our invention:

| | |
|---|---|
| EPR 144* | 54.50 weight % |
| OMICURE ® U-405** | 3.11 weight % |
| Amicure ® CG-1200*** | 3.11 weight % |
| Ensaco 260 granular **** | 6.37 weight % |
| Kevlar IF 538***** | 0.04 weight % |
| Mica N ****** | 28.75 weight % |
| Araldite DY-C ******* | 2.54 weight % |
| ECKA Kontaktargan ******** | 1.58 weight % |

*EPR 144 = EPIKOTE ® Resin 144 ex Hexion, Seciality Chemicals. This is an epoxy resin based on a blend of a bisphenol F resin (produced from bisphenol F and epichlorohydrin) and bisphenol A resin (produced from bisphenol A and epichlorohydrin). Epoxy number: 44.3-25.5%, Test Method DIN 16945; Viscosity at 25° C. 3700-4700 mPa · s, Test Method DIN 53015; Epoxy equivalent 169-177 g/equivalent, Test Method DIN 16945.
**OMICURE ® U-405 = Phenyl Dimethyl Urea; CAS NO. 101-42-8, ex CVC Speciality Chemicals Inc.
***Amicure ® CG-1200 = a micronized grade of dicyandiamide containing 0.5% of an inert flow control additive, ex Air Products.
****Ensaco 260 granular = Conductive Carbon Black, Fine black granules, Characteristics of ENSACO ® 260: BET surface area (ATSM D3037): 70 m²/g, DBP absorption (ASTM D2414): 190 ml/100 g, Density (ASTM D1513): 170 kg/m³, pH (ASTM D1512): 8-11, ex TIMCAL BELGIUM
*****Kevlar ® IF 538 = Aramid Fiber.
******Mica N = Muskovite mica, ex Aspanger Bergbau und Mineralwerke GmbH.
*******Araldite DY-C = Diglycidylether of cyclohexane dimethanol, Epoxy equivalent 167-179 g/equivalent; Viscosity at 25° C. 60-90 mPa · s, Epoxy index 5.60-6.00 Eq/kg, ex Huntsman.
********ECKA Kontaktargan = Fine copper powder coated with silver. Characteristics: Lamellar Particle shape, Specific surface (Fischer): 5000 cm²/g, Silver content 12-14%; ex ECKA Granules Germany GmbH, Fürth, Germany.

We claim:

1. A curable adhesive composition having PTC characteristics after curing, comprising
   (i) a reactive binder system, based on an epoxy-resin-component and a curing agent-component,
   (ii) particles of a carbon modification in a range of 0.01 wt % to 15.0 wt %, based on the total weight of the curable adhesive composition,
   (iii) copper powder in a range of 0.5 wt % to 5.0 wt %, based on the total weight of the curable adhesive composition,
   wherein the reactive binder system comprises>70 wt % of all organic polymers of the adhesive composition.

2. The adhesive composition according to claim 1, wherein the copper powder particles are coated with silver.

3. The adhesive composition according to claim 1, wherein the total amount of conductive particles lies in a range of 1 wt % to 12.0 wt % based on the total weight of the curable adhesive composition.

4. The adhesive composition according to claim 1, wherein the carbon modification is selected from carbon fibers, graphite, carbon black, activated carbon, carbon nanotubes or combinations thereof.

5. The adhesive composition according to claim 1, wherein the reactive binder system comprises ≥75 wt % of all organic polymers of the adhesive composition.

6. The adhesive composition according to claim 1, wherein the reactive binder system has a glass-transition temperature after hardening of ≥100° C., determined via dynamic scanning calorimetry.

7. The adhesive composition according to claim 1, comprising 0.02-1 wt % of toughening fibers.

8. The adhesive composition according to claim 1, wherein the electrical conductivity of the cured composition is substantially isotropic, wherein the specific electrical resistance at 22° C. is in the range from 1 $\Omega$cm to $10^5$ $\Omega$cm.

9. The adhesive composition according to claim 1, wherein the system viscosity at 22° C. and at infinite shear rate is 10 to 150 Pa·s.

10. The adhesive composition according to claim 1, comprising 10-50 wt % of inert filler with a dieletrical strength >60 MV/m.

11. The adhesive composition according to claim 1, comprising
    (i) a reactive binder system, based on an epoxy-resin-component and a curing agent-component, in amounts of 40-70 wt %,
    (ii) carbon black, in amounts of 1-10.0 wt %,
    (iii) copper powder, preferably silver coated copper powder, in amounts of 0.5-3 wt %,
    (iv) toughening fibers, in amounts of 0.02-1 wt %,
    (v) inert filler with a dieletrical strength >60 MV/m, in amounts of 10-50 wt %,
wt % for (i) to (v) in each case based on the total weight of the curable adhesive composition, wherein the reactive binder system comprises≥75 wt % of all organic polymers of the whole adhesive composition,
and wherein the reactive binder system has a glass-transition temperature after hardening of≥100° C., determined via dynamic scanning calorimetry.

12. A process for producing an assembly according to claim 11, wherein the curable adhesive composition is
    (i) applied between two electrodes, preferably mesh electrodes, so that the electrodes are connected with the adhesive
and thereafter
    (ii) the adhesive is cured.

13. The process for producing an assembly according to claim 12, wherein the reactive binder system has a cure cycle of 1 hour at 100° C. plus 1 hour at 180° C.

14. The process for producing an assembly according to claim 12, wherein the reactive binder system has a cure cycle of 1 hour at 100° C. plus 1 hour at 150° C.

15. An assembly, containing a first and a second electrode, which are jointly glued with a cured adhesive composition according to claim 1.

16. The assembly according to claim 15, wherein the electrodes are mesh electrodes.

* * * * *